Patented May 13, 1952

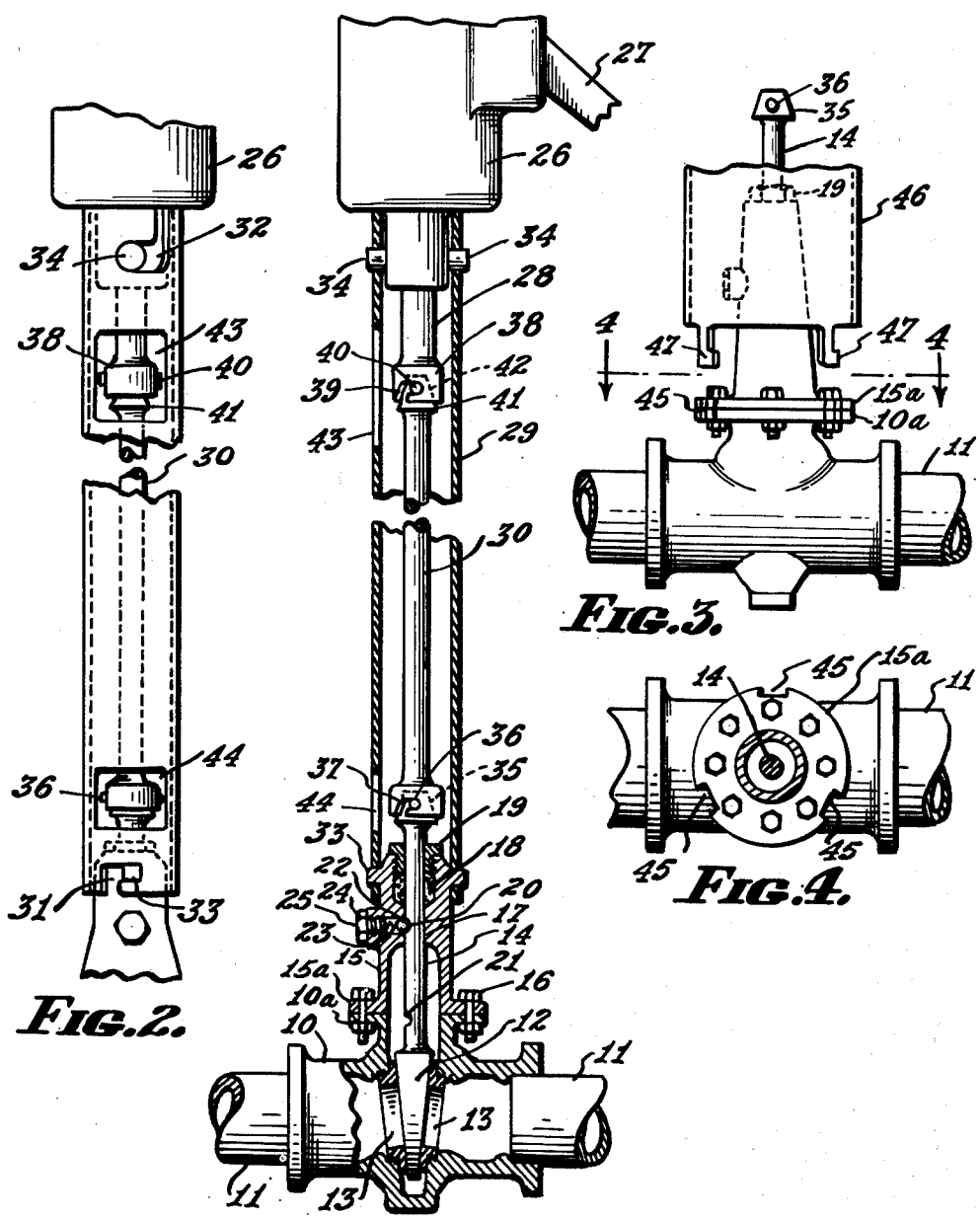

2,596,532

UNITED STATES PATENT OFFICE 2,596,532

HYDRAULIC JACK OPERATED VALVE AND ATTACHMENT

William N. Coolidge and Frank W. Geiger, Cincinnati, Ohio

Application October 11, 1946, Serial No. 702,693

4 Claims. (Cl. 137—139)

This invention relates to a hydraulically operated valve and attachment. While the invention is susceptible to many applications, it will be found of particular value in connection with relatively large size valves (six inch and up), such as are found in water mains. Often valves in water mains are under considerable pressure, and if a break occurs in the system this break must be isolated by shutting down valves on either side of the break. After the break has been repaired, the valves must be reopened to permit water to flow through the repaired section. The turning on and shutting off of such valves requires tremendous force. In many instances within our experience, we have put a heavy bar through the valve wheel and have seen the bar bent by the efforts of four men on each end of the bar. Even when the valve is considered relatively easy to open, it may require the efforts of two or more men.

Often the threads in the valve stem will be stripped off by the efforts of a crew in trying to open a stuck valve.

In the light of the above difficulties, it is an object of our invention to provide a valve of such construction that it may be opened or closed by means of a hydraulic jack, and to provide an attachment to form a connection between the jack and the valve. Another object of our invention involves the provision of an attachment which can be easily secured to the valve so that if the manhole is flooded or under water, the attachment can be applied by feel.

Further objects of our invention include the provision of a valve and attachment as outlined above which will be simple in construction and which will materially reduce maintenance difficulties and which can, if necessary, be operated by one man.

These and other objects of our invention which will be pointed out hereinafter in more detail or which will be apparent to one skilled in the art upon reading this specification, we accomplish by that certain construction and arrangement of parts of which we shall now describe exemplary embodiments.

Reference is made to the drawings forming a part hereof, and in which:

Figure 1 is an elevational view with parts in section showing our invention in use.

Figure 2 is an elevational view as seen from the left of Figure 1.

Figure 3 is an elevational view of a valve with a fragment of the attachment showing a modification of our invention.

Figure 4 is a cross sectional view taken on the line 4—4 of Figure 3.

Briefly, in the practice of our invention, we provide a valve which is standard in most respects, but which is modified in one major respect. In Figure 1, the valve which is indicated generally at 10 is being placed in a main 11. A usual gate 12 is provided which seats against seat member 13. The valve has a stem 14, and it will be noted that the stem is unthreaded, and in this respect our valve differs from the conventional valve.

A bonnet 15 is fastened to the body 10 by flange 15a engaging a flange 10a and attached thereto as indicated at 16. The bonnet 15 is provided with a guide bearing 17 for the stem 14, and packing material 18 is pressed around the valve stem by means of the member 19, as is conventional. Since our valve has an unthreaded stem, we provide means for holding it in opened and closed position. These means comprise notches 20 and 21 in the valve stem and a ball 22 seated in a bore 23 and pressed against the valve stem by a spring 24, held in position by a cap screw 25. The ball 22 engages yieldingly in the notches 20 or 21 to hold the valve in either its opened or closed position.

A hydraulic jack is indicated at 26 having an operating handle 27 and a plunger 28. The jack itself forms no part of our invention and will, therefore, not be described in detail.

The attachment for connecting the jack to the valve comprises a tubular outer member 29 and a rod-like inner member 30. The member 29 is provided with the bayonet slots 31 at its lower end and the bayonet slots 32 at its upper end. The slots 31 are engaged over bosses 33 formed in the bonnet 15 of the valve, while the slots 32 engage bosses 34 formed on the jack body. Thus, the member 29 rigidly connects together the jack body and the valve body. The member 30 serves to connect together the jack plunger and the valve stem, and to this end the valve stem may terminate in a conical portion 35 provided with pins 36, and the lower end of the member 30 may have a conical bore and the bayonet slots 37. Similarly, the swiveling head 38 of the jack plunger may be provided with bayonet slots 39 engaging pins 40 at the upper end of the member 30. To facilitate proper attachment the end of the member 30 may be made conical as at 41 to engage the conical bore 42 in the head 38. It will be clear that it makes no difference whether the conical extension is a part of the jack plunger or of the member 30 as shown. Both ends of the member 30 could be arranged as indicated at the lower end of the figure, or both could be arranged as indicated at the upper end of the figure.

In order to facilitate proper connection of the member 30 at the top and bottom, we prefer to provide windows 43 and 44 in the member 29.

In practice, the member 29 would probably be put in position first over the valve bonnet. The member 30 would then be lowered inside the member 29 and engaged, as shown. If the manhole is not flooded, this operation may be observed and assisted through the window 44. The jack would then be attached to the upper end by advancing the plunger and engaging it as shown, and then retracting the plunger to bring the pins 34 in proper relation to the bayonet slots 32.

It will be clear that the inner member could be placed in position first over the valve stem and the outer member could be lowered over the inner member and then engaged. The exigencies of the particular situation will dictate the better procedure. Likewise, the pins 34 could be engaged in the slots 32 and then the plunger could be advanced to engage with the member 30.

In Figures 3 and 4, we have shown a slight modification of the invention in which we eliminate the bosses 33 and instead provide slots 45 in the flanges 15a and 19a. In this modification we make the tubular member 29 larger in diameter as shown at 46 and provide at its lower end L-shaped extensions 47. It may pass through the slots 45 and with a slight turn engage under the flange 10a.

It will be clear that numerous modifications will suggest themselves to those skilled in the art, and that fundamentally our invention visualizes a rigid connection between a valve body and either the fixed or movable element of a jack and a rigid connection between the valve stem and the other of said elements of a jack. The precise arrangement shown is, therefore, not a limitation upon our invention, except insofar as is pointed out in the claims which follow.

Having now fully described our invention, what we claim as new and desire to secure by Letters Patent is:

1. In combination with a reciprocating valve, having a body and a smooth stem, means for holding said stem yieldingly in open and closed position for said valve, a hydraulic jack having a body and a plunger, and a separate adapter device comprising an outer tubular member and an inner operating member, and means for attaching said outer member at one end to said jack body and at the other end to said valve body, and means for attaching said inner member at one end to said jack plunger and at the other end to said valve stem, said attaching means comprising bayonet slot type arrangements.

2. The combination of claim 1 in which said stem terminates in a conical portion, and in which said inner member is provided at one end with a conical bore to assist in bringing said inner member into operative engagement with said stem.

3. The combination of claim 1, in which said valve body has a bonnet fastened thereon by means of flanges, and in which said flanges are provided with means for engagement with the adjacent bayonet slots of said outer member.

4. The combination of claim 1, in which said valve body is provided with a flange, and said flange is provided with means for engagement with the adjacent bayonet slots of said outer member.

WILLIAM N. COOLIDGE.
FRANK W. GEIGER.

REFERENCES CITED

The following references are of record in the file of this patent:

UNITED STATES PATENTS

| Number | Name | Date |
|---|---|---|
| 295,676 | Ross | Mar. 25, 1884 |
| 766,753 | Brooks | Aug. 2, 1904 |
| 954,437 | Jacob | Apr. 12, 1910 |
| 1,562,223 | Gannestad | Nov. 17, 1925 |
| 1,610,020 | McIlhenny | Dec. 7, 1926 |
| 1,929,867 | Hall | Oct. 10, 1933 |
| 2,237,377 | Thwarts | Apr. 8, 1941 |
| 2,368,457 | Eisenbeis | Jan. 30, 1945 |

FOREIGN PATENTS

| Number | Country | Date |
|---|---|---|
| 58,131 | Austria | Mar. 1913 |